(12) United States Patent
Goodman et al.

(10) Patent No.: US 9,849,992 B2
(45) Date of Patent: Dec. 26, 2017

(54) INLINE PRESSURE REGULATING VALVE ASSEMBLY WITH INLET PRESSURE BIAS

(71) Applicant: United Technologies Corporation, Farmington, CT (US)

(72) Inventors: Robert Goodman, West Hartford, CT (US); Zhijun Zheng, Avon, CT (US); Michael D. Greenberg, Bloomfield, CT (US)

(73) Assignee: United Technologies Corporation, Farmington, CT (US)

( * ) Notice: Subject to any disclaimer, the term of this patent is extended or adjusted under 35 U.S.C. 154(b) by 219 days.

(21) Appl. No.: 15/161,404

(22) Filed: May 23, 2016

(65) Prior Publication Data

US 2017/0334566 A1 Nov. 23, 2017

(51) Int. Cl.
| | |
|---|---|
| *F16K 1/12* | (2006.01) |
| *B64D 15/04* | (2006.01) |
| *F16K 31/06* | (2006.01) |
| *F16K 17/02* | (2006.01) |
| *F02C 7/047* | (2006.01) |
| *F01D 25/24* | (2006.01) |
| *B64D 33/02* | (2006.01) |

(52) U.S. Cl.
CPC ............ *B64D 15/04* (2013.01); *B64D 33/02* (2013.01); *F01D 25/24* (2013.01); *F02C 7/047* (2013.01); *F16K 17/02* (2013.01); *F16K 31/06* (2013.01); *B64D 2033/0233* (2013.01); *F05D 2220/323* (2013.01)

(58) Field of Classification Search
CPC .... Y10T 137/353; B64D 15/04; B64D 33/02; F01D 25/24; F02C 7/047; F16K 17/02
See application file for complete search history.

(56) References Cited

U.S. PATENT DOCUMENTS 2,747,614 A * 5/1956 Gray ...................... G01L 13/02
73/707
2,965,137 A * 12/1960 Leeson .................. F01D 17/08
60/39.281

(Continued)

FOREIGN PATENT DOCUMENTS

GB 1345351 1/1974
WO WO2015130384 A2 9/2015

OTHER PUBLICATIONS

Pressure-Compensated Flow Control Valves, website <http://www.valvehydraulic.info/creation-and-control-of-fluid-flow/pressure-compensated-flow-control-valves.html>, 3 pages, visited Feb. 4, 2016.

(Continued)

*Primary Examiner* — Craig Schneider
*Assistant Examiner* — Kevin Barss
(74) *Attorney, Agent, or Firm* — Kinney & Lange, P.A.

(57) ABSTRACT

An assembly includes a first enclosed flexible pressure chamber. A first extension arm extends from a first endwall of the first enclosed flexible pressure chamber. A second enclosed flexible pressure chamber includes a second extension arm extending from a second endwall of the second enclosed flexible pressure chamber. A lever arm is disposed on a pivot. A first end of the lever arm is attached to the first extension arm and a second end of the lever arm is attached to the second extension arm. A variable restriction element is connected to the second end of the lever arm.

18 Claims, 6 Drawing Sheets

(56) References Cited

U.S. PATENT DOCUMENTS

| | | | | |
|---|---|---|---|---|
| 3,119,405 A * | 1/1964 | Guy | ............... | F16K 1/126 |
| | | | | 137/219 |
| 3,234,730 A * | 2/1966 | Ryder | ............... | F02K 3/10 |
| | | | | 137/115.03 |
| 3,363,414 A * | 1/1968 | Johnson | ............... | F02C 7/22 |
| | | | | 60/243 |
| 3,400,590 A * | 9/1968 | Lanctot | ............... | F01D 17/02 |
| | | | | 73/430 |
| 3,611,719 A * | 10/1971 | Stearns | ............... | F02C 9/32 |
| | | | | 60/39.281 |
| 3,620,011 A * | 11/1971 | Urban | ............... | F02C 9/32 |
| | | | | 60/39.281 |
| 3,711,543 A * | 1/1973 | Bollag | ............... | C07C 51/60 |
| | | | | 544/169 |
| 3,741,610 A | 6/1973 | Holland | | |
| 3,766,834 A * | 10/1973 | Kraemer | ............... | H01H 35/2671 |
| | | | | 200/83 C |
| 4,106,510 A | 8/1978 | Hakim et al. | | |
| 4,187,673 A * | 2/1980 | Smith | ............... | F02C 9/32 |
| | | | | 60/39.281 |
| 4,300,348 A * | 11/1981 | Lewis | ............... | F02C 9/32 |
| | | | | 60/39.281 |
| 4,318,070 A | 3/1982 | Dohrmann et al. | | |
| 4,320,872 A | 3/1982 | Frederick | | |
| 4,646,624 A * | 3/1987 | Stearns | ............... | G01L 13/02 |
| | | | | 73/716 |
| 4,688,745 A | 8/1987 | Rosenthal | | |
| 4,715,397 A * | 12/1987 | Stearns | ............... | F02C 9/263 |
| | | | | 137/486 |
| 4,805,658 A * | 2/1989 | Perkinson | ............... | F02C 9/263 |
| | | | | 137/115.03 |
| 5,052,384 A * | 10/1991 | Kaneko | ............... | B63C 11/24 |
| | | | | 128/201.27 |
| 5,257,498 A | 11/1993 | Nikkanen et al. | | |
| 6,694,746 B2 * | 2/2004 | Reed | ............... | F02C 7/047 |
| | | | | 137/488 |
| 7,131,612 B2 | 11/2006 | Baptist et al. | | |
| 7,780,117 B2 | 8/2010 | Botura et al. | | |
| 7,909,261 B2 | 3/2011 | Ellstrom et al. | | |
| 7,959,109 B2 | 6/2011 | Dasilva et al. | | |
| 8,251,679 B2 * | 8/2012 | Kuehner | ............... | A61B 17/3203 |
| | | | | 417/413.1 |
| 8,572,985 B2 | 11/2013 | Waddleton | | |
| 9,169,779 B2 | 10/2015 | Winter | | |
| 2009/0078828 A1 | 3/2009 | Sugai et al. | | |
| 2010/0154987 A1 | 6/2010 | Vontell, Sr. | | |

OTHER PUBLICATIONS

Parker, TPC Pressure, Temperature Compensated Flow Control Valve, website <(b)http://www.parker.com/portal/site/PARKER/menuitem.de7b26ee6a659c147cf26710237ad1ca/?vgnextoid=fcc9b5bbec622110VgnVCM10000032a71dacRCRD&vgnextchannel=fcc9b5bbec622110VgnVCM10000032a71dacRCRD&vgnextfmt=default&vgnextdiv=687 505 &vgnextcatid=1537967&vgnextcat=TPC+FPRESSURE%2C+TEMPERATURE+COMPENSATED+FLOW+CONTROL+VALVE&Wtky=>, 4 pages, visited Feb. 4, 2016.

Extended European Search Report for EP Application No. 17172523.7, dated Sep. 19, 2017, 7 Pages.

* cited by examiner

INLINE PRESSURE REGULATING VALVE ASSEMBLY WITH INLET PRESSURE BIAS

BACKGROUND

The present disclosure relates generally to pressure regulation systems, and more particularly to servo actuated valves used in anti-icing systems for aircraft.

Operation of aircraft engines in adverse weather conditions or at high altitudes can sometimes lead to ice forming on the exposed surfaces of the engine nacelle inlet. The build-up of ice on a nacelle surrounding the engine limits the quantity of air being fed to the engine. This reduction in inlet airflow can result in a reduction of power output, efficiency and/or cooling capacity of the engine. Engine inlet anti-icing systems commonly employ a thermal source, such as hot air bled from the engine core, which is applied to the nacelle inlet to prevent ice build-up on the external surfaces thereof.

Another concern with aircraft engines is the useful life of the aircraft engine and components. The build-up of ice near the inlet of the engine may lead to large pieces of ice breaking loose from the inlet and flowing into the gas turbine engine. Ice flowing into and through the engine may damage components within the engine, such as airfoils, and components attached to the nacelle, such as inlet acoustic panels. The damaged components may then require repair or replacement.

Current anti-icing systems for simplicity include valves that do not compensate for increases in bleed air temperature with increasing bleed pressure and as a result, a delivered heat flux which is a function of flow times bleed air temperature can result in damage to the nacelle from overheating.

SUMMARY

An assembly includes a first enclosed flexible pressure chamber. A first extension arm extends from a first endwall of the first enclosed flexible pressure chamber. A second enclosed flexible pressure chamber includes a second extension arm extending from a second endwall of the second enclosed flexible pressure chamber. A lever arm is disposed on a pivot. A first end of the lever arm is attached to the first extension arm and a second end of the lever arm is attached to the second extension arm. A variable restriction element is connected to the second end of the lever arm.

A method of regulating pressure of a fluid in an assembly includes biasing a fluid inlet pressure of a regulating valve. A fluid is received in a first flexible pressure chamber. A first force is exerted onto the first flexible pressure chamber from the fluid. A lever arm attached to a first extension arm connected to the first flexible pressure chamber is actuated. A pintle connected to the lever arm is actuated. An amount of fluid released into an ambient environment from the assembly is adjusted. A fluid servo pressure within a pressure chamber of the regulating valve is changed. A regulating valve element of the regulating valve is modulated. A fluid outlet pressure of the fluid flowing out of an outlet of the regulating valve is then adjusted.

An assembly includes a regulating valve with an inlet. A controller is fluidly connected to the inlet of the regulating valve. The controller includes a first enclosed flexible pressure chamber, a second enclosed flexible pressure chamber, and a lever arm. The second enclosed flexible pressure chamber is fluidly connected to an outlet of the regulating valve. The lever arm is disposed on a pivot. A first end of the lever arm is connected to a first extension arm extending from a first endwall of the first enclosed flexible pressure chamber. A second end of the lever arm is connected to a second extension arm extending from a second endwall of the second enclosed flexible pressure chamber. A pintle is connected to the second end of the lever arm. A solenoid valve is fluidly connected to the pintle and to a pressure chamber of the regulating valve.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure describes examples which provide a bias of a pressure regulation set-point of a valve such that when the pressure from the bleed air to the valve is high and associated temperature is hotter, the bias causes a reduction in a valve regulated pressure and results in maintaining an approximately fixed heat load to an inlet of an engine. A moment balance about a pivot point can be used to adjust a lever arm connected to a bellows assembly to adjust a positioning of a pintle which releases air into ambient thereby adjusting the pressure bias of an anti-icing system of the engine. The biased pressure regulator allows the set-point to be raised slightly higher when the pressure from the bleed air to the valve is low and associated temperature is lower, to ensure any ice is fully melted and to not overheat the engine inlet when both the pressure and temperature are higher.

Figure 1:
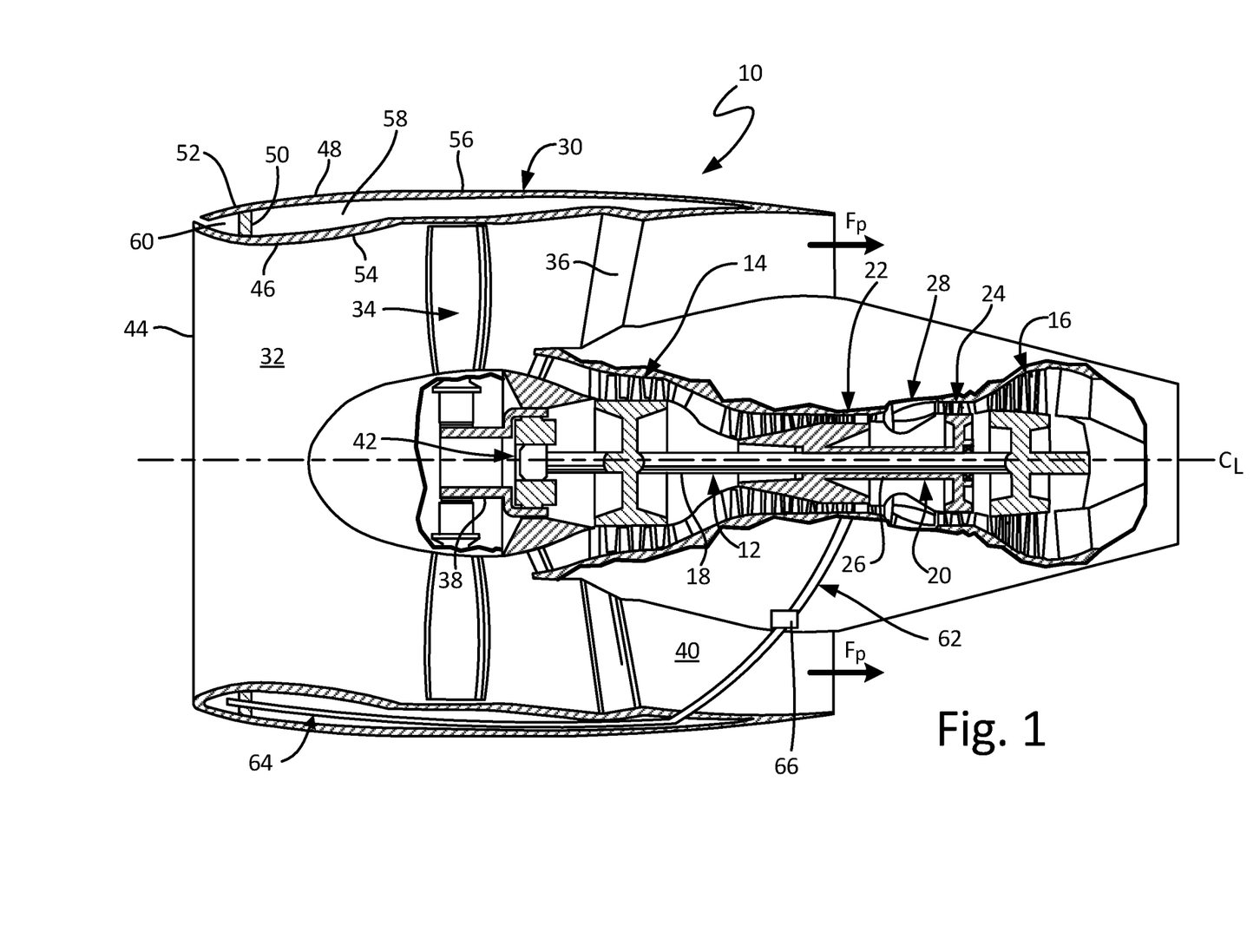
FIG. 1 is a cross-sectional view of a gas turbine engine.

FIG. 1 is a cross-sectional view of gas turbine engine 10, in a two-spool turbofan configuration for use as a propulsion engine on an aircraft. As shown in the figure, low spool 12 includes low pressure compressor ("LPC") 14 and low pressure turbine ("LPT") 16, rotationally coupled via low pressure shaft 18. High spool 20 includes high pressure compressor ("HPC") 22 and high pressure turbine ("HPT") 24, rotationally coupled via high pressure shaft 26. High spool 20 is coaxially oriented about low spool 12, along engine centerline (or turbine axis) $C_L$, with combustor 28 positioned in flow series between high pressure compressor 22 and high pressure turbine 24.

Nacelle 30 is oriented about the forward end of gas turbine engine 10. Fan casing 32 extends along on the radially inner surface of nacelle 30, from propulsion fan 34 to fan exit guide vane 36. Propulsion fan 34 is rotationally coupled to low spool 12 via fan shaft 38, generating propulsive flow $F_P$ through fan duct (or bypass duct) 40. In advanced engine designs, fan drive gear system 42 couples fan shaft 38 to low spool 12 at low pressure shaft 18, providing independent fan speed control for reduced noise and improved operating efficiency.

Nacelle 30 extends forward of the gas turbine engine 10 and defines inlet 44 for incoming fluid. Nacelle 30 includes inner barrel 46, outer barrel 48, bulkhead 50, and inlet shell 52. Inner barrel 46 defines radially outer flow surface 54 for a portion of the flowpath of gas turbine engine 10. Outer barrel 48 defines outer flow surface 56 for the external medium flowing about gas turbine engine 10. A radial separation between inner barrel 46 and outer barrel 48 defines annular chamber 58 there between. Inlet shell 52 is the leading edge for nacelle 30. Inlet shell 52 and bulkhead 50 bound annular shell cavity 60.

Fluid pressure regulation system 62 is fluidly connected to HPC 22 and extends into annular chamber 58. Anti-icing system 64 is positioned within nacelle 30 and transfers fluid, in this example bleed air, into annular shell cavity 60. Fluid pressure regulation system 62 includes valve assembly 66 which can be made up of one or more of a variety of valves and flow regulators to control the flow of bleed air through fluid pressure regulation system 62 (as will be discussed with respect to the remaining figures). In other non-limiting embodiments, fluid pressure regulation system 62 can extend along the interior of annular chamber 58 before introducing bleed air into annular shell cavity 60.

Figure 2:
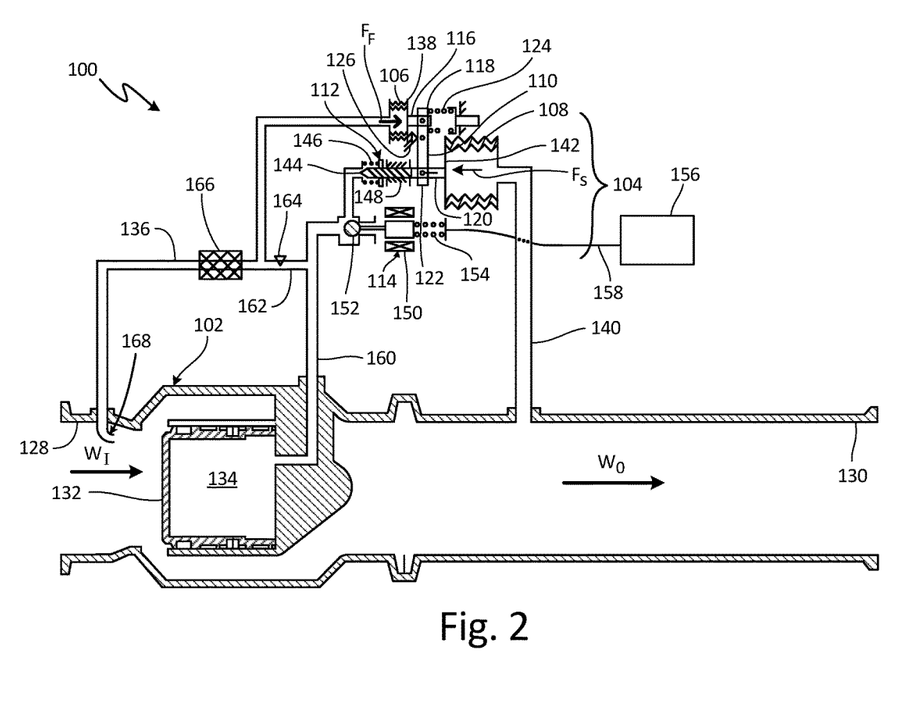
FIG. 2 is a cross-sectional view of a valve assembly including a regulating valve in an open position and a pressure controller.

FIG. 2 is a cross-sectional view of valve assembly 100 including regulating valve 102 (shown in an open position) and pressure controller 104. Valve assembly 100 can be used as or with valve assembly 66. Pressure controller 104 includes first enclosed flexible pressure chamber 106, second enclosed flexible pressure chamber 108, lever arm 110, variable restriction element 112, and solenoid valve 114. First enclosed flexible pressure chamber 106 includes first extension arm 116 which is attached to first end 118 of lever arm 110. Second enclosed flexible pressure chamber 108 includes second extension arm 120 which is attached to second end 122 of lever arm 110. Also attached to first end 118 of lever arm 110 in the illustrated embodiment is first spring element 124. Lever arm 110 is disposed on pivot 126 and is configured to rotate about pivot 126.

Regulating valve 102 includes inlet 128, outlet ducting 130, regulating valve sleeve element 132, and pressure chamber 134. Inlet 128 provides an opening through which flow $W_I$ enters into regulating valve 102 from fluid regulation system 62, while outlet ducting 130 provides an opening through which flow $W_O$ exits regulating valve 102. Regulating valve 102 is configured such that as a pressure inside of pressure chamber 134 changes, regulating valve sleeve element 132 modulates, or actuates, along a linear pathway in response the change in pressure in pressure chamber 134. The positioning of regulating valve sleeve element 132 regulates an amount of flow $W_O$ exiting from outlet ducting 130 by controlling an effective area that flow $W_I$ passes through as it travels through regulating valve 102, past regulating valve sleeve element 132, and through outlet ducting 130.

Flow $W_O$ of the fluid is transferred from regulating valve 102 to nacelle 30 of FIG. 1, which includes anti-icing system 64, of gas turbine engine 10. Thermal energy is then transferred from flow $W_O$ to nacelle 30 through anti-icing system 64 and the build-up of ice on nacelle 30, and in particular on a leading edge of inlet 44, is reduced in response to transferring thermal energy from flow $W_O$ to nacelle 30 and into annular shell cavity 60. For example, a lower pressure of flow $W_O$ exiting out of outlet ducting 130 results in less flow $W_O$ of bleed air to anti-icing system 64 and a resulting lower heat flux to the nacelle and thereby reducing metal temperature of inlet 44 of nacelle 30. In another example, a higher pressure of flow $W_O$ exiting out of outlet ducting 130 results in a higher flow $W_O$ of bleed air to anti-icing system 64 and a resulting in a higher metal temperature of inlet 44 of nacelle 30.

First enclosed flexible pressure chamber 106 is fluidly connected to inlet 128 of regulating valve 102 by line 136. First extension arm 116 extends from first rigid endwall 138 of first enclosed flexible pressure chamber 106 and connects to first end 118 of lever arm 110. First end 118 of lever arm 110 is located on an upper portion of lever arm 110 in FIG. 2. During operation of valve assembly 100, an inlet pressure from flow $W_I$ from inlet 128 flows through line 136 and into first enclosed flexible pressure chamber 106. The inlet pressure from flow $W_I$ is received into first enclosed flexible pressure chamber 106 and the fluid from flow $W_I$ exerts first force $F_F$ onto first rigid endwall 138 of first enclosed flexible pressure chamber 106. First extension arm 116 is pivotally attached to lever arm 110 such that as first flexible compression chamber 106 compresses and expands from receiving first force $F_F$ from flow $W_I$, first extension arm 116 moves in a substantially linear motion thereby causing lever arm 110 to actuate and rotate about pivot 126. In one non-limiting example, first enclosed flexible pressure chamber 106 can be made up of one or more bellows or other expandable/contractible devices with a pressure chamber, which can also include first rigid endwall 138 attached to first extension arm 116.

Second enclosed flexible pressure chamber 108 is fluidly connected to outlet ducting 130 of regulating valve 120 by line 140. Second extension arm 120 extends from second rigid endwall 142 of second enclosed flexible pressure chamber 108 and connects to second end 122 of lever arm 110. Second end 122 of lever arm 110 is located on a lower portion of lever arm 110 in FIG. 2. During operation of valve assembly 100, an outlet pressure from flow $W_O$ from outlet ducting 130 flows through line 140 and into second enclosed flexible pressure chamber 108. The inlet pressure from flow $W_O$ is received into second enclosed flexible pressure chamber 108 and the fluid from flow $W_O$ exerts second force $F_S$ onto second rigid endwall 142 of second enclosed flexible pressure chamber 108. Second extension arm 120 is pivotally attached to lever arm 110 such that as second flexible compression chamber 108 compresses and expands from receiving second force $F_S$ from flow $F_O$, second extension arm 120 moves in a linear motion thereby causing lever arm 110 to actuate and rotate about pivot 126. With both first force $F_F$ and second force $F_S$ being applied to first end 118 and second end 122 respectively of lever arm 110, a moment balance is applied to lever arm 110 about pivot 126 upon which lever arm 110 is attached. In one non-limiting example, second enclosed flexible pressure chamber 108 can be made up of one or more bellows or other expandable/contractible devices with a pressure chamber, which can also include second rigid endwall 142 attached to second extension arm 120.

As first force $F_F$ and second force $F_S$ are applied to lever arm 110, both first force $F_F$ and second force $F_S$ apply torque, or moment(s) of torsion, to lever arm 110 such that lever arm 110 is pushed to rotate in a clockwise direction in FIG. 2. In one non-limiting example, an increase in both first force $F_F$ and second force $F_S$ causes both first force $F_F$ and second force $F_S$ to increase the amount of torque applied to lever arm 110 by first force $F_F$ and second force $F_S$ in a clockwise direction. In another non-limiting example, a decrease in both first force $F_F$ and second force $F_S$ causes both first force $F_F$ and second force $F_S$ to decrease the amount of torque applied to lever arm 110 by first force $F_F$ and second force $F_S$ such that lever arm 110 rotates in a counter-clockwise, or anti-clockwise direction in FIG. 2.

As shown in FIG. 2, second enclosed flexible pressure chamber 108 can have a larger size and/or diameter than first enclosed flexible pressure chamber 106. In other non-limiting embodiments, both of second enclosed flexible pressure chamber 108 and first enclosed flexible pressure chamber 106 can have varying sizes, lengths, shapes, diameters, configurations, and/or materials.

Also connected to first end 118 of lever arm 110 is first spring element 124. First spring element 124 is attached to first end 118 of lever arm 110 on an opposite side of lever arm 110 as first enclosed flexible pressure chamber 106. A spring force of first spring element 124 can be adjusted to bias lever arm 110 against the force applied to first end 118 of lever arm 110 by first enclosed flexible pressure chamber 106. For example, in one non-limiting embodiment, the spring force of first spring element 124 can be threadably adjusted to a desired level for a particular operating condition of gas turbine engine 10.

Variable restriction element 112 includes pintle 144, second spring element 146, and housing 148. Pintle 144 is pivotally attached to second end 122 of lever arm 110 opposite from second extension arm 120. As lever arm 110 rotates about pivot 126, pintle 144 moves in a linear motion within housing 148 thereby causing pintle 144 to actuate. As pintle 144 actuates, an effective vent area is varied thereby releasing adjusted amounts of fluid out of variable restriction element 112 and into an ambient environment from valve assembly 100. Second spring element 146 biases pintle 144 against housing 148 to keep pintle 144 within housing 148, and also to partially bias second end 122 of lever arm 110 against second enclosed flexible pressure chamber 108. The position of pintle 144 determines the amount of fluid allowed to pass out of variable restriction element 112 and into ambient thereby setting a resultant servo pressure in pressure chamber 134 of regulating valve 102. For example, when pintle 144 is positioned to the left in FIG. 2, less venting of fluid flow from valve assembly 100 would occur thereby increasing of pressure in pressure chamber 134 and causing regulating valve sleeve element 132 to close. Alternatively, when pintle 144 is positioned to the right in FIG. 2 (as shown in FIG. 2) more venting of fluid flow from valve assembly 100 would occur thereby decreasing the pressure in pressure chamber 134 and causing regulating valve sleeve element 132 to open.

Solenoid valve 114 includes solenoid 150, solenoid valve element 152, and third spring element 154. Solenoid valve 114 can be electrically connected by wires 158 to full authority digital engine control ("FADEC") 156 of the aircraft. Solenoid valve 114 can receive an electrical signal from FADEC 156 which controls solenoid valve 114 and a position of solenoid valve element 152. As the electrical signal is received by solenoid valve 114, solenoid 150 (e.g., electromagnetic coil) becomes energized creating a magnetic field which is applied to solenoid valve element 152 causing solenoid valve element 152 to actuate along a linear pathway and into an energized position. The electrical signal can be terminated to de-energize solenoid 150 thereby reducing the magnetic field which causes solenoid valve element 152 to actuate linearly into a de-energized position. Solenoid valve 114 can be in a default closed position, such that solenoid valve element 152 occupies a closed positioned when solenoid 150 is de-energized. Upon being energized, a magnetic field of solenoid 150 pulls solenoid valve element 152 towards third spring element 154 thereby compressing third spring element 154 thereby opening solenoid valve 114.

In another non-limiting embodiment, solenoid valve 114 can also include a default open configuration such that solenoid valve element 152 occupies an open position when de-energized and a closed position upon receiving an electrical signal and becoming energized. In FIG. 2, solenoid valve element 152 is shown in an open position to the right of solenoid valve 114 (and to the right in FIG. 2), which can be either an energized or de-energized position. Solenoid valve 114 can receive the electrical signal from FADEC 156 and/or from other electronic devices in the aircraft such as pilot instrumentation. Solenoid valve 114 is fluidly connected to pressure chamber 134 of regulating valve 102 by line 160.

Line 160 and line 136 are connected by line 162. Line 162 can include restriction element 164 which restricts a flow of fluid passing from line 136, through line 162, and into line 160. Restriction element 164 can include an orifice including a smaller diameter than a diameter of line 162. A size of restriction element 164 can be set to include a specific effective area which reduces the flow of fluid through line 162. In one non-limiting example, the effective area of restriction element 164 can include a diameter of 0.020 to 0.040 inches (0.051 to 0.102 centimeters). Additionally, line 162 can include a smaller diameter than lines 160 and/or 136 to achieve a desired pressure of fluid flow restriction or allowance through line 162.

Line 136 can include filter 166. Filter 166 is located in line 136 and can extend across at least a portion of a diameter of line 136. Filter 166 can be used to filter out particles in the fluid, or to adjust the flow of fluid reaching restriction element 164. Filter 166 can protect restriction element 164 from adverse flow conditions, pressure surges, high flow rates, or from particles striking restriction element 164. Filter 166 can be installed into line 136 so as to be replaceable or removable from line 136, but can also be permanently or semi-permanently positioned in line 136. Additionally, pitot tube 168 or another shielded air entrance device can be placed in line 136 to filter out particles in the fluid, or to adjust the flow of fluid through line 136.

Outlet ducting 130 of regulating valve 102 can be fluidly connected to holes in annular shell cavity 60. A size of the holes in annular shell cavity 60 can be set to include a specific effective area which reduces the flow of fluid out of annular shell cavity 60. In one non-limiting example, the effective area of the holes in annular shell cavity 60 can include an effective area of 0.60 to 0.80 inches (1.524 to 2.032 centimeters).

During operation of valve assembly 100, solenoid valve 114 effectively controls the amount of pressure received by pressure chamber 134. As solenoid valve 114 is opened, an amount of fluid allowed to pass through solenoid valve 114, past pintle 144 and into ambient, is increased. As the amount of fluid exiting valve assembly 100 increases, the resulting pressure within pressure chamber 134 decreases causing regulating valve sleeve element 132 to modulate to the right of FIG. 2 in response the decrease in pressure in pressure chamber 134. As regulating valve sleeve element 132 moves to the right of FIG. 2, an effective area of flow through regulating valve 102 is increased therefore increasing the amount of flow $W_O$ exiting from outlet ducting 130. As solenoid valve 114 is closed, an amount of fluid allowed to pass through solenoid valve 114, past pintle 144, and into ambient is decreased. As the amount of fluid exiting valve assembly 100 decreases, the resulting pressure within pressure chamber 134 increases causing regulating valve sleeve element 132 to modulate to the left of FIG. 2 in response the increase in pressure in pressure chamber 134. As regulating valve sleeve element 132 moves to the left of FIG. 2, an effective area of flow through regulating valve 102 is decreased therefore decreasing the amount of flow $W_O$ exiting from outlet ducting 130. Valve assembly 100 is an example of a servo actuated valve with a controller to modulate a servo pressure to modulate a regulating valve and control regulated pressure.

Figure 3:
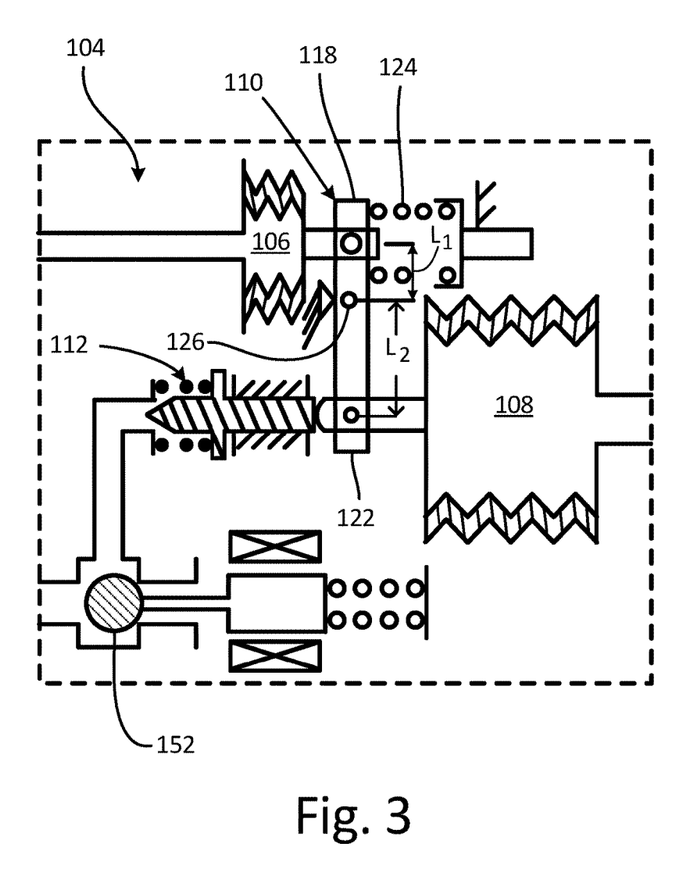
FIG. 3 is an enlarged cross-sectional view of a portion of the valve assembly of FIG. 2.

FIG. 3 is an enlarged cross-sectional view of valve assembly 100 of FIG. 2. The resultant regulated pressure $P_{reg}$ of flow $W_O$ out of outlet ducting 130 can be represented by the following control equation:

$$P_{reg} = \frac{F_{spring} \times L_1}{A_2 \times L_2} - \frac{P_1 \times A_1 \times L_1}{A_2 \times L_2} \quad (1)$$

Where: $F_{spring}$ is spring force of first spring element 124, $L_2$ is length from pivot 126 to a second point of attachment on second end 122 of lever arm 110, $A_2$ is area of second enclosed flexible pressure chamber 108, $L_1$ is length from pivot 126 to a first point of attachment on first end 118 of lever arm, $P_I$ is inlet pressure, and $A_1$—area of first enclosed flexible pressure chamber 106. In equation (1), the term $(P_1*A_1*L_2)/(A_2*L_1)$ is inlet pressure bias force. In the alternative, regulated pressure $P_{reg}$ can be represented as:

$$P_{reg} = \frac{L_1}{A_2 \times L_2} \times (F_{spring} - P_1 \times A_1) \quad (2)$$

In one non-limiting example, values for $A_2$, $A_1$, $L_1$, and $L_2$ can include $A_2$=0.384 inches$^2$ (2.477 centimeters$^2$), $A_1$=0.053 inches$^2$ (0.342 centimeters$^2$), $L_1$=0.50 inches (1.27 centimeters), and $L_2$=0.28 inches (0.71 centimeters). Control equation (1) can be used to determine how regulated pressure $P_{reg}$ varies with inlet pressure. As can be seen with control equation (1), the amount of bias on regulated pressure $P_{reg}$ can be adjusted by varying the size and/or area of first enclosed flexible pressure chamber 106 and second enclosed flexible pressure chamber 108, the length and points of attachment along lever arm 110, and the spring forces of first, second, and third spring elements 124, 146, and 154.

As $P_{reg}$ increases, second force $F_S$ on second enclosed flexible pressure chamber 108 increases which acts to move second end 122 of lever arm 110 to the left of FIG. 2, actuating pintle 144 to the left of FIG. 2 thereby closing variable restriction member 112, increasing servo pressure within pressure chamber 134, and causing regulating valve 102 to close modulate to the left of FIG. 2. Conversely, as $P_{reg}$ decreases, second force $F_S$ on second enclosed flexible pressure chamber 108 decreases which acts to move second end 122 of lever arm 110 to the right of FIG. 2, actuating pintle 144 to the right of FIG. 2 thereby opening variable restriction member 112, decreasing servo pressure within pressure chamber 134, and causing regulating valve 102 to open and modulate to the right in FIG. 2.

Figure 4:
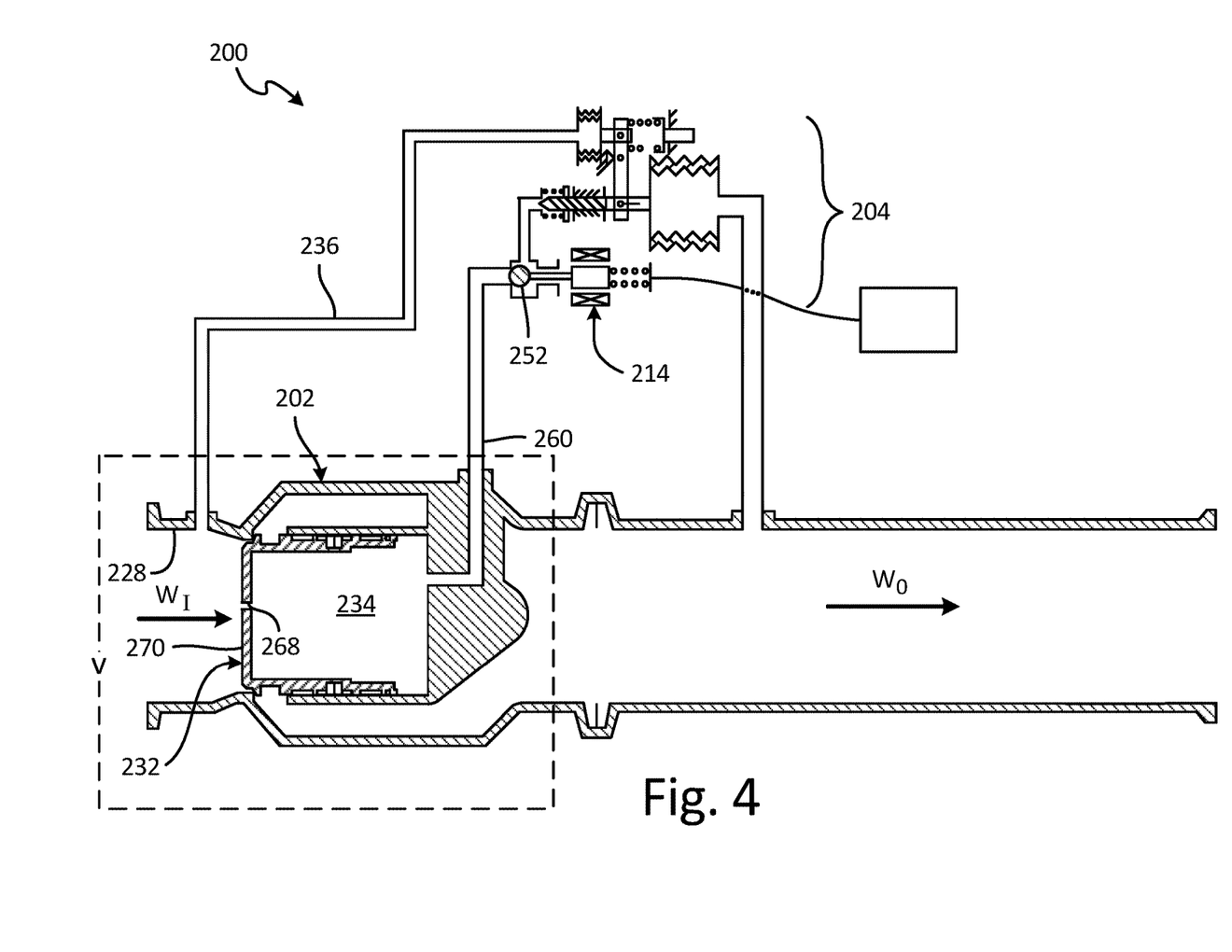
FIG. 4 is a cross-sectional view of another valve assembly including a regulating valve in a closed position and a pressure controller.

FIG. 4 is a cross-sectional view of valve assembly 200 including regulating valve 202 in a closed position and pressure controller 204. In FIG. 4, solenoid valve element 252 is shown in a closed position to left of solenoid valve 214 (left of FIG. 4), which can be either an energized or de-energized position. Whereas in FIG. 2, solenoid valve element 152 is shown in an open position to the right of solenoid valve 114 (and to the right in FIG. 2).

In comparison to valve assembly 100 shown in FIG. 2, valve assembly 200 does not include a line between line 236 and line 260. Instead of a line directly connecting line 236 and line 260, hole 268 on first face 270 of regulating valve sleeve element 232 effectively connects line 236 and line 260 by fluidly connecting inlet 228 to pressure chamber 234 of regulating valve 202. Fluidly connecting inlet 228 and pressure chamber 234 reduces loss in pressure of $W_I$ as compared to valve assembly 100 because inlet flow $W_I$ in valve assembly 100 is required to turn from inlet 128 and into to line 136 resulting in a pressure loss of the fluid flowing into line 136. In valve assembly 200, flow $W_I$ flows directly into pressure chamber 234 without turning which provides for a decrease in loss of pressure of inlet flow $W_I$ as inlet flow $W_I$ transfers from inlet 228 to line 260. In one non-limiting example, the diameter of hole 268 can include a diameter of approximately 0.020 to 0.030 inches (0.051 to 0.0762 centimeters).

Figure 5:
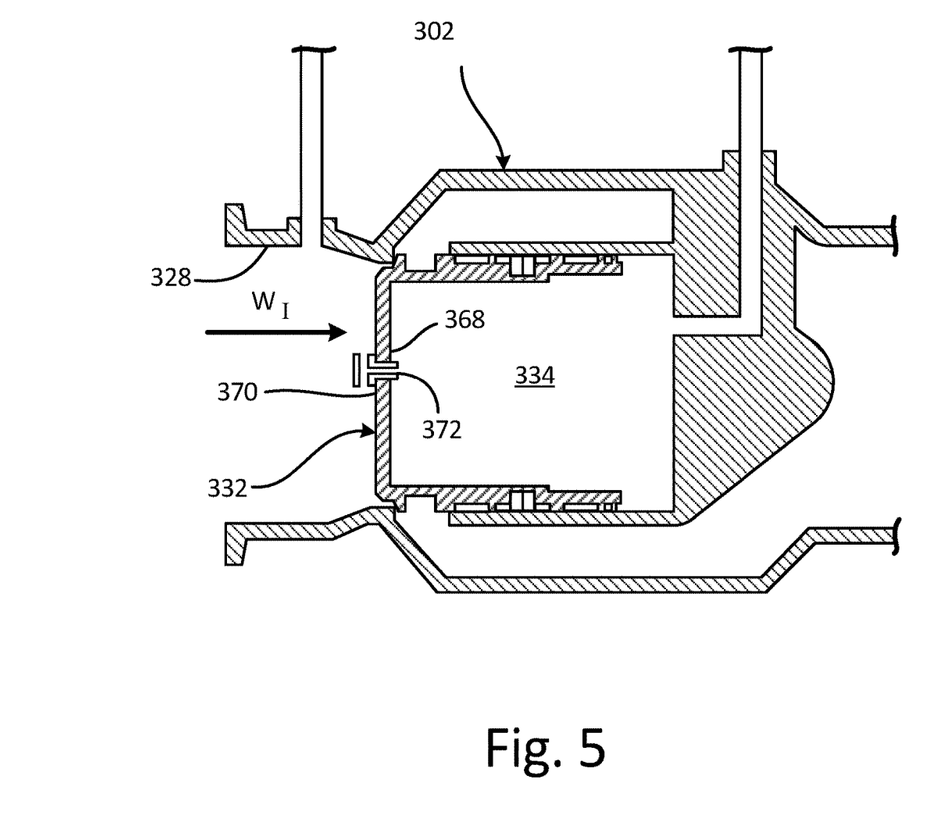
FIG. 5 is a cross-sectional view of a regulating valve with an orifice plug in a valve element.

FIG. 5 shows a cross-sectional view of regulating valve 302 with orifice plug 372 in regulating valve sleeve element 332. Orifice plug 372 is removably positioned in hole 368 in first face 370 of regulating valve sleeve element 332. Orifice plug 372 provides contamination resistance of flow $W_I$ as flow $W_I$ enters into pressure chamber 334 by forcing flow $W_I$ to turn into orifice plug 372, through orifice plug 372, and into pressure chamber 334. When orifice plug 372 is placed in hole 368, flow $W_I$ is prevented from flowing through hole 368 therefore increasing the pressure of fluid in line 236 and disconnecting pressure chamber 334 from flow $W_I$.

Figure 6:
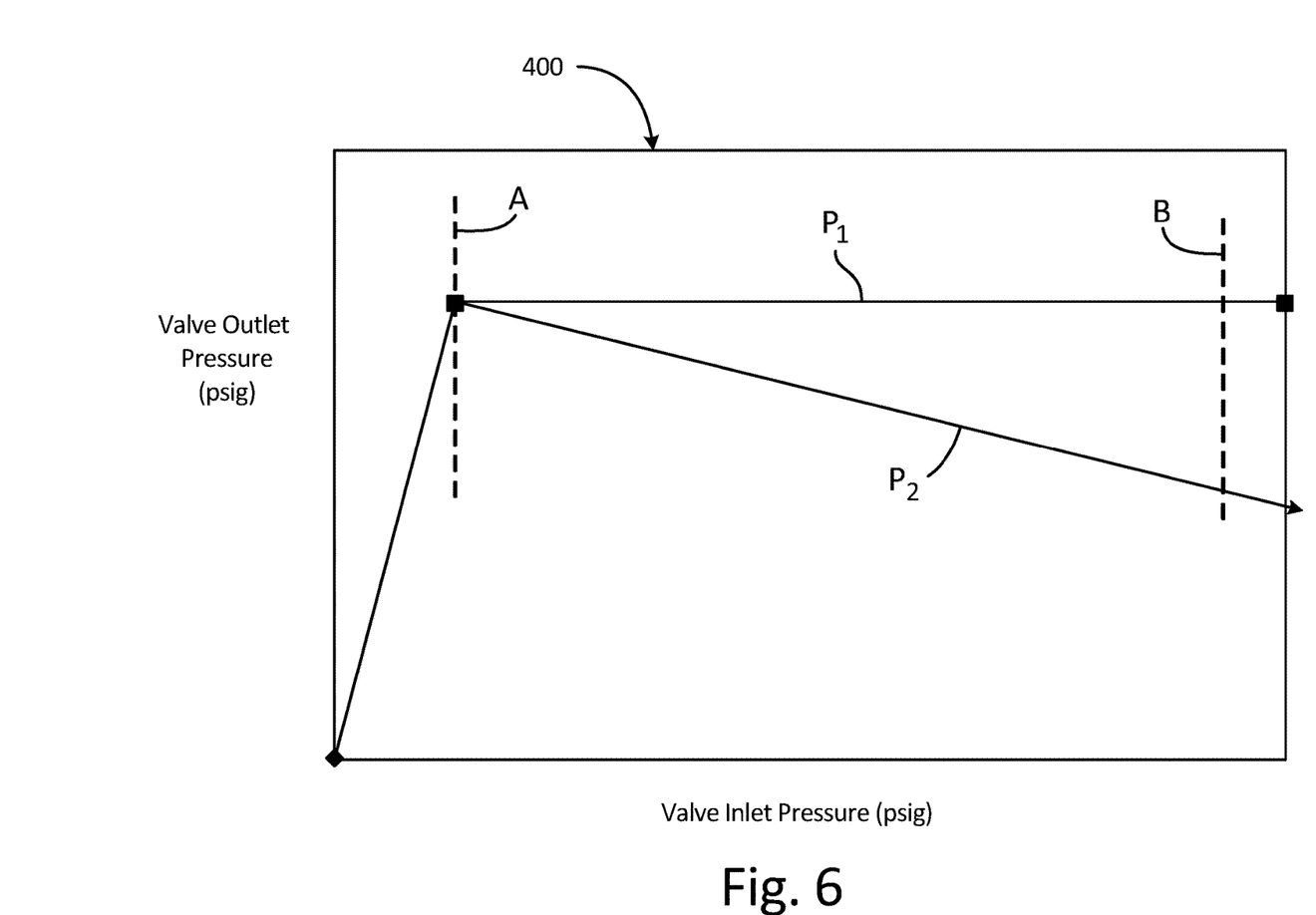
FIG. 6 is a graph of valve outlet pressure as a function of valve inlet pressure.

FIG. 6 shows graph 400 of valve outlet pressure as a function of valve inlet pressure of valve assemblies 100 and 200 shown in FIGS. 2 and 4 respectively. During engine operation, as the engine bleed air temperature increases, the valve inlet pressure and the valve outlet pressure increase until the valve outlet pressure achieves regulation set-point A.

In a system without a servo actuated valve assembly, such as valve assemblies 100 or 200 for example, further increases to the valve inlet pressure result in a constant outlet pressure $P_1$ as indicated by the zero slope of the line between set-point A and set-point B. Without a reduction in valve outlet pressure $P_1$, the corresponding nacelle inlet temperature continues to increase as the valve inlet pressure is increased between set-point A and set-point B potentially causing damage to the nacelle of a gas turbine engine.

In a system with a servo actuated valve assembly, such as valve assemblies 100 or 200 for example, once regulated pressure $P_{reg}$ reaches set-point A, further increases to the valve inlet pressure result in a reduced regulated pressure $P_{reg}$ as indicated by the negative slope of the line between set-point A and set-point B. With a reduction in regulated pressure $P_{reg}$, causing a decrease in flow and reduced heat flux to the nacelle, the corresponding nacelle inlet temperature is maintained at a set value as the valve inlet pressure is increased between set-point A and set-point B.

An example regulated pressure $P_{reg}$ value for set-point A includes a pressure of approximately 45 psi (310 kpa) and an example for set-point B includes a pressure of approximately 30 psi (207 kpa). Example ranges for the axes of graph 114 include 0-350 psi (0-2,413 kpa) along the independent (e.g. horizontal axis) and 0-60 psi (0-414 kpa) along the dependent (e.g. vertical axis) with regards to the valve outlet pressure. An example nacelle inlet temperature value at set-point A for regulated pressure $P_{reg}$ includes a temperature of approximately 500° F. (260° C.). An example range of nacelle inlet temperatures is 32° to 800° F. (0° to 427° C.) with regards to nacelle inlet temperature.

Additionally, as a non-limiting example, the line segments representing valve regulated pressure $P_{reg}$ can be made up of one or more of varying slopes and/or curvilinear data points.

DISCUSSION OF POSSIBLE EMBODIMENTS

The following are non-exclusive descriptions of possible embodiments of the present invention.

An assembly can include a first enclosed flexible pressure chamber. A first extension arm can extend from a first endwall of the first enclosed flexible pressure chamber. A second enclosed flexible pressure chamber can include a second extension arm extending from a second endwall of the second enclosed flexible pressure chamber. A lever arm can be disposed on a pivot. A first end of the lever arm can be attached to the first extension arm and a second end of the lever arm can be attached to the second extension arm. A variable restriction element can be connected to the second end of the lever arm.

The assembly of the preceding paragraph can optionally include, additionally and/or alternatively, any one or more of the following features, configurations and/or additional components:

a further embodiment of the foregoing assembly, wherein the variable restriction element can further comprise a pintle;

a further embodiment of any of the foregoing assemblies, wherein the pressure controller can be fluidly connected to a regulating valve with a regulating valve element;

a further embodiment of any of the foregoing assemblies, wherein the second flexible pressure chamber can be fluidly connected to an outlet of the regulating valve;

a further embodiment of any of the foregoing assemblies, wherein the first flexible pressure chamber can be fluidly connected to an inlet of the regulating valve;

a further embodiment of any of the foregoing assemblies, wherein the regulating valve can be fluidly connected to an anti-icing system for a nacelle inlet of an aircraft engine;

a further embodiment of any of the foregoing assemblies, wherein the assembly can further comprise a solenoid valve that can be fluidly connected to the pintle and to a pressure chamber of the regulating valve;

a further embodiment of any of the foregoing assemblies, wherein the solenoid valve can be electrically connected to a full authority digital engine control of an aircraft;

a further embodiment of any of the foregoing assemblies, wherein the regulating valve element can further comprise a hole on a first face of the valve element facing the inlet of the regulating valve; and/or a further embodiment of any of the foregoing assemblies, wherein the assembly can further comprise a solenoid valve that can be fluidly connected to the pintle, to a pressure chamber of the regulating valve, and/or to the inlet of the regulating valve.

A method of regulating pressure of a fluid in an assembly can include biasing a fluid inlet pressure of a regulating valve. A fluid can be received in a first flexible pressure chamber. A first force can be exerted onto the first flexible pressure chamber from the fluid. A lever arm that can be attached to a first extension arm that can be connected to the first flexible pressure chamber can be actuated. A pintle that can be connected to the lever arm can be actuated. An amount of the fluid that can be released into an ambient environment from the assembly can be adjusted. A fluid servo pressure that can be within a pressure chamber of the regulating valve can be changed. A regulating valve element of the regulating valve can be modulated. A fluid outlet pressure of the fluid that can flow out of an outlet of the regulating valve can be then adjusted.

The method of the preceding paragraph can optionally include, additionally and/or alternatively, any one or more of the following features, configurations and/or additional components:

a further embodiment of the foregoing method, wherein actuating the lever arm can further comprise receiving the outlet pressure in a second flexible pressure chamber, exerting a second force onto the second flexible pressure chamber, and/or applying a moment balance to the lever arm about a pivot upon which the lever arm can be attached;

a further embodiment of any of the foregoing methods, wherein the method can further comprise biasing the lever arm by adjusting a spring force of a first spring element that can be connected to a first end of the lever arm;

a further embodiment of any of the foregoing methods, wherein the method can further comprise energizing a solenoid valve which can actuate a solenoid valve element of the solenoid valve; and/or a further embodiment of any of the foregoing methods, wherein the method can further comprise controlling the solenoid valve with an electrical signal from a full authority digital engine control.

An assembly can include a regulating valve with an inlet. A controller can be fluidly connected to the inlet of the regulating valve. The controller can include a first enclosed flexible pressure chamber, a second enclosed flexible pressure chamber, and a lever arm. The second enclosed flexible pressure chamber can be fluidly connected to an outlet of the regulating valve. The lever arm can be disposed on a pivot. A first end of the lever arm can be connected to a first extension arm extending from a first endwall of the first enclosed flexible pressure chamber. A second end of the lever arm can be connected to a second extension arm extending from a second endwall of the second enclosed flexible pressure chamber. A pintle can be connected to the second end of the lever arm. A solenoid valve can be fluidly connected to the pintle and/or to a pressure chamber of the regulating valve.

The assembly of the preceding paragraph can optionally include, additionally and/or alternatively, any one or more of the following features, configurations and/or additional components:

a further embodiment of the foregoing assembly, wherein the regulating valve is fluidly connected to an anti-icing system for a nacelle inlet of an aircraft engine;

a further embodiment of any of the foregoing assemblies, wherein at least one of the first enclosed flexible pressure chamber and the second enclosed flexible pressure chamber can comprise a bellows with rigid endwalls;

a further embodiment of any of the foregoing assemblies, wherein the solenoid valve can be fluidly connected to the inlet of the regulating valve; and/or a further embodiment of any of the foregoing assemblies, wherein the regulating valve element can further comprise a hole on a first face of the valve element facing the inlet of the regulating valve.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
a first enclosed flexible pressure chamber with a first extension arm extending from a first endwall of the first enclosed flexible pressure chamber, wherein the assembly is fluidly connected to a regulating valve with a regulating valve element, wherein the first flexible pressure chamber is fluidly connected to an inlet of the regulating valve;
a second enclosed flexible pressure chamber with a second extension arm extending from a second endwall of the second enclosed flexible pressure chamber;
a lever arm disposed on a pivot, wherein a first end of the lever arm is attached to the first extension arm, and wherein a second end of the lever arm is attached to the second extension arm; and
a variable restriction element connected to the second end of the lever arm.

2. The assembly of claim 1, wherein the variable restriction element comprises:
a pintle.

3. The assembly of claim 1, wherein the second flexible pressure chamber is fluidly connected to an outlet of the regulating valve.

4. The assembly of claim 1, wherein the regulating valve is fluidly connected to an anti-icing system for a nacelle inlet of an aircraft engine.

5. The assembly of claim 1, wherein the variable restriction element comprises a pintle, and further comprising:
a solenoid valve fluidly connected to the pintle and to a pressure chamber of the regulating valve.

6. The assembly of claim 5, wherein the solenoid valve is electrically connected to a full authority digital engine control of an aircraft.

7. The assembly of claim 5, wherein the regulating valve element comprises:
a hole on a first face of the valve element facing the inlet of the regulating valve.

8. The assembly of claim 1, wherein the variable restriction element comprises a pintle, and further comprising:
a solenoid valve fluidly connected to the pintle, to a pressure chamber of the regulating valve, and to the inlet of the regulating valve.

9. A method of regulating pressure of a fluid in an assembly, the method comprising:
biasing a fluid inlet pressure of a regulating valve, wherein biasing the fluid inlet pressure comprises:
receiving fluid in a first flexible pressure chamber;
exerting a first force onto the first flexible pressure chamber from the fluid;
actuating a lever arm attached to a first extension arm connected to the first flexible pressure chamber;
actuating a pintle connected to the lever arm;
adjusting an amount of the fluid released into an ambient environment from the assembly;
changing a fluid servo pressure within a pressure chamber of the regulating valve;
modulating a regulating valve element of the regulating valve; and
adjusting a fluid outlet pressure of the fluid flowing out of an outlet of the regulating valve.

10. The method of claim 9, wherein actuating the lever arm further comprises:
receiving the outlet pressure in a second flexible pressure chamber;
exerting a second force onto the second flexible pressure chamber; and
applying a moment balance to the lever arm about a pivot upon which the lever arm is attached.

11. The method of claim 9, further comprising:
biasing the lever arm by adjusting a spring force of a first spring element connected to a first end of the lever arm.

12. The method of claim 9, further comprising:
energizing a solenoid valve which actuates a solenoid valve element of the solenoid valve.

13. The method of claim 12, further comprising:
controlling the solenoid valve with an electrical signal from a full authority digital engine control.

14. An assembly comprising:
a regulating valve with an inlet;
a controller fluidly connected to the inlet of the regulating valve, wherein the controller comprises:
a first enclosed flexible pressure chamber;
a second enclosed flexible pressure chamber fluidly connected to an outlet of the regulating valve;
a lever arm disposed on a pivot;
a first end of the lever arm, wherein the first end of the lever arm is connected to a first extension arm extending from a first endwall of the first enclosed flexible pressure chamber;
a second end of the lever arm, wherein the second end of the lever arm is connected to a second extension arm extending from a second endwall of the second enclosed flexible pressure chamber;
a pintle connected to the second end of the lever arm; and
a solenoid valve fluidly connected to the pintle and to a pressure chamber of the regulating valve.

15. The assembly of claim 14, wherein the regulating valve is fluidly connected to an anti-icing system for a nacelle inlet of an aircraft engine.

16. The assembly of claim 14, wherein at least one of the first enclosed flexible pressure chamber and the second enclosed flexible pressure chamber comprise:
a bellows with rigid endwalls.

17. The assembly of claim 14, wherein the solenoid valve is fluidly connected to the inlet of the regulating valve.

18. The assembly of claim 17, wherein the regulating valve element comprises:
a hole on a first face of the valve element facing the inlet of the regulating valve.

* * * * *